Figure 1:
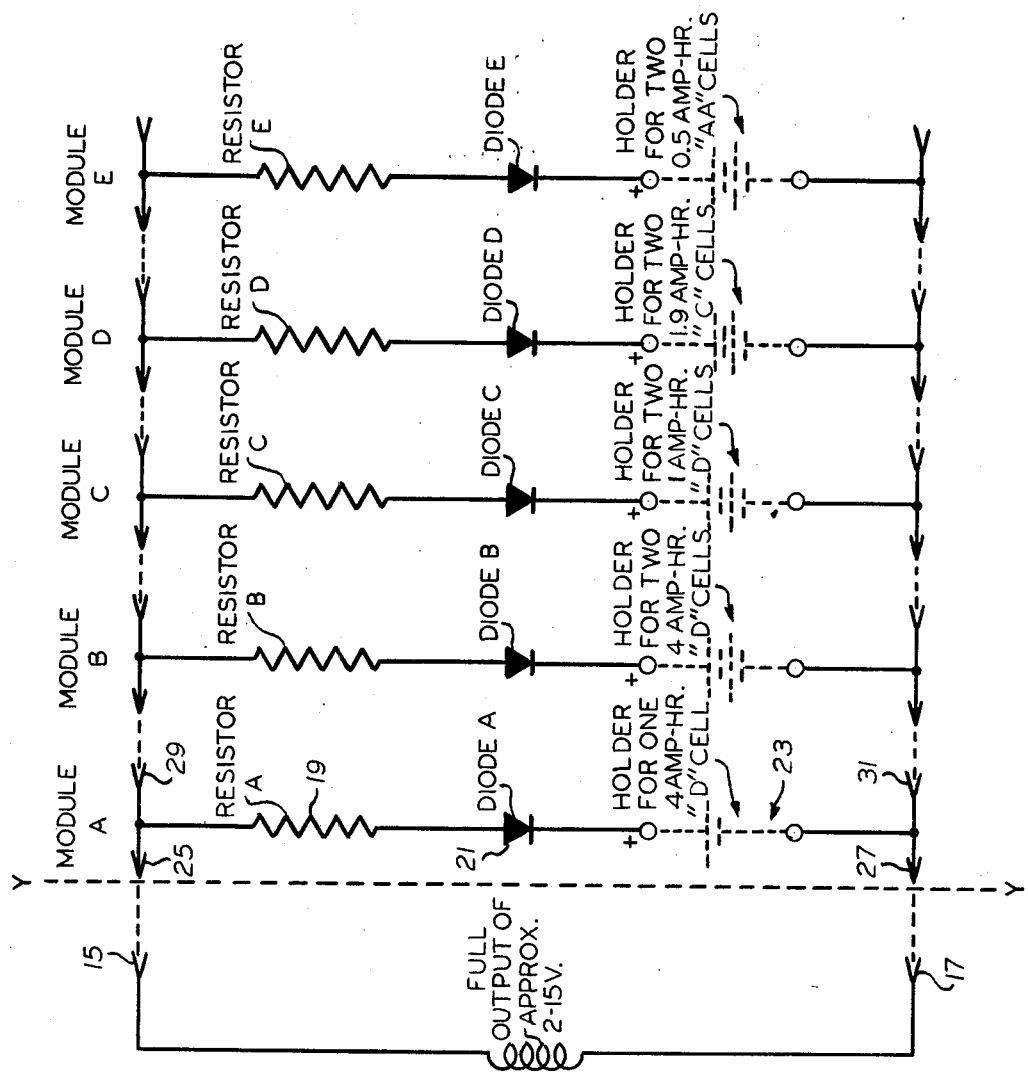
Figure 1:
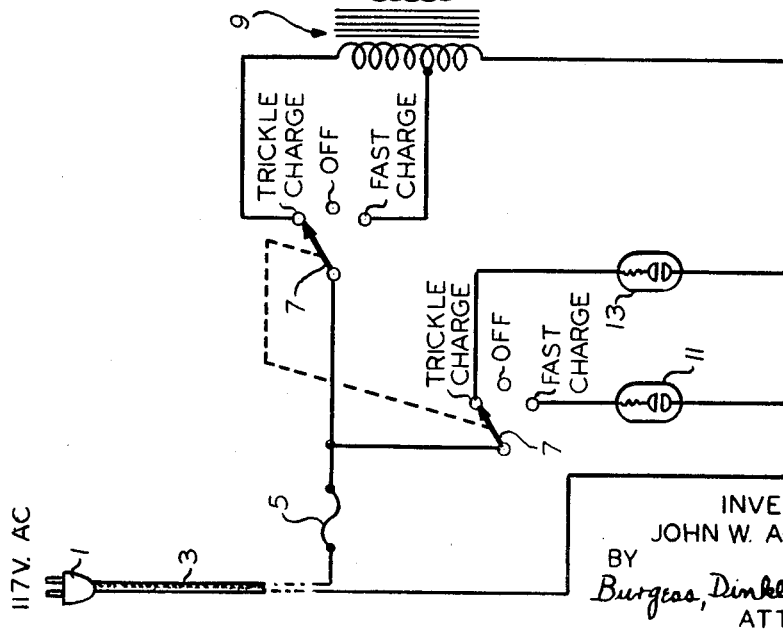

United States Patent
Ackley, III

[15] 3,696,283
[45] Oct. 3, 1972

[54] MODULAR BATTERY CHARGER

[72] Inventor: John W. Ackley, III, 310 E. 71st St., New York, N.Y. 10021

[22] Filed: April 15, 1970

[21] Appl. No.: 28,702

[52] U.S. Cl. .................................. 320/2, 320/15
[51] Int. Cl. ........................................ H01m 45/04
[58] Field of Search ........... 320/2, 15, 22, 51, 53, 57, 320/59, 48; D26/15.2; 339/147 P, 191

[56] References Cited

UNITED STATES PATENTS

| | | | |
|---|---|---|---|
| 3,217,224 | 11/1965 | Sherwood | 320/2 |
| 3,274,476 | 9/1966 | Wildum | 320/2 |
| 2,780,766 | 2/1957 | Hedding et al. | 320/4 |
| 3,217,227 | 11/1965 | Sherwood | 320/2 UX |
| 3,171,076 | 2/1965 | Medlar | 320/22 |
| 3,307,096 | 2/1967 | Lyon | 320/15 |
| 2,418,141 | 4/1947 | Salazar | 320/51 X |
| 2,424,059 | 7/1947 | Scott | 320/4 |
| 2,605,455 | 7/1952 | Swartz | 320/4 |
| 2,369,033 | 2/1945 | Eubank | 320/4 |

FOREIGN PATENTS OR APPLICATIONS

| | | | |
|---|---|---|---|
| 212,453 | 12/1960 | Austria | 320/2 |

OTHER PUBLICATIONS

Published Specification, Ser. No. 427,480 Pub. 6/43 by Alien Property Custodian, Inventor Zdansky Primary Examiner—J. D. Miller
Assistant Examiner—Robert J. Hickey
Attorney—Burgess, Dinklage & Sprung

[57] ABSTRACT

Battery charger assembly comprising a power supply module and, detachably mated thereto and to each other, a series of charging modules capable of accommodating a varying number of cells to be charged wherein each charging module individually can accommodate cells of differing physical and electrical size, the power supply module and the charging modules together forming a parallel circuit of which each charge module forms one parallel leg.

10 Claims, 2 Drawing Figures

INVENTOR
JOHN W. ACKLEY, III

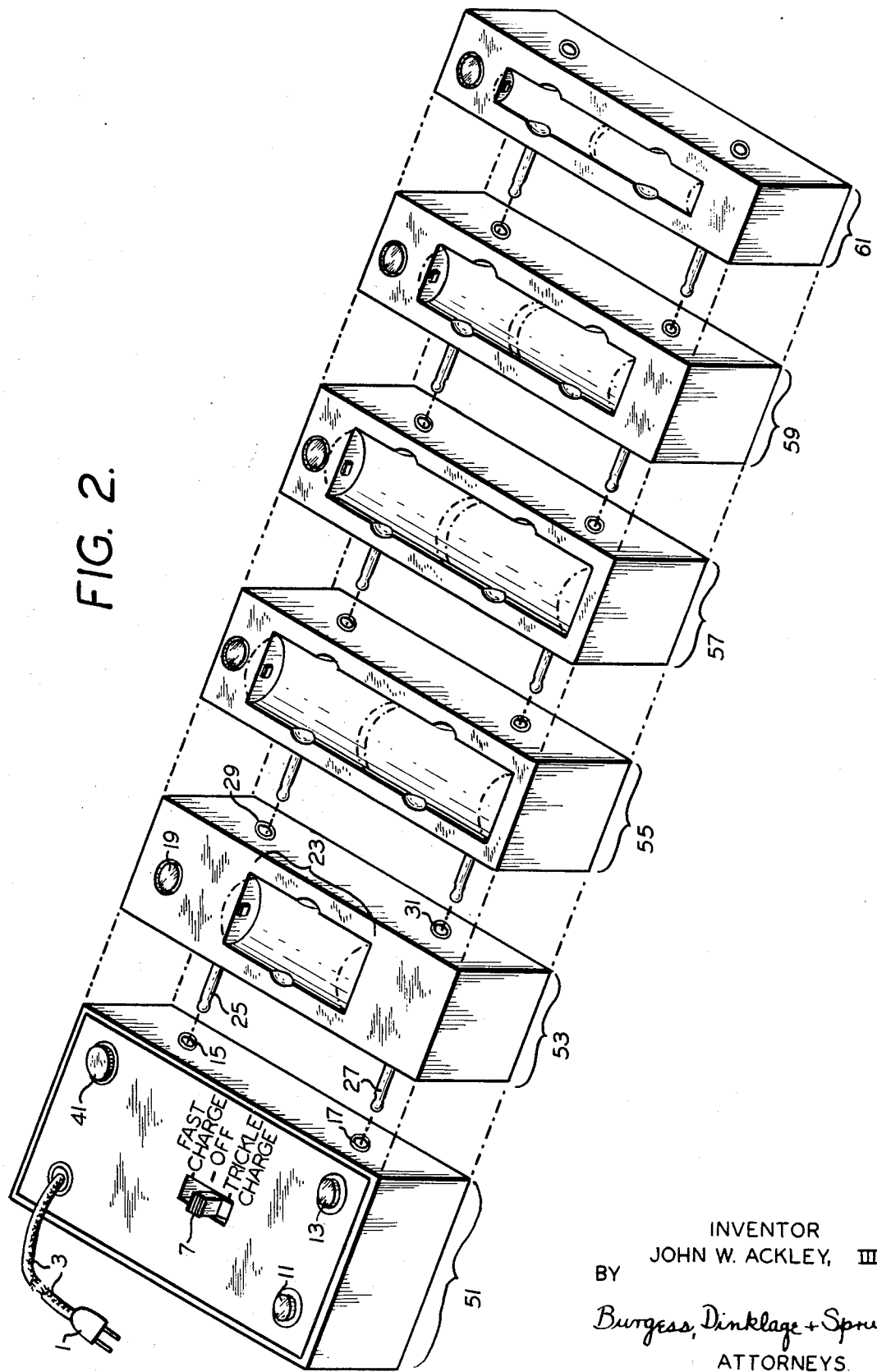

MODULAR BATTERY CHARGER

This invention relates to battery chargers and is more specifically directed to a modular battery charger having multiple charging modules.

In many household and light industrial operations, rechargeable batteries of different physical size and electrical characteristics are required and need to be recharged fairly frequently. To meet this need, several attempts have been made to design charging apparatus capable of handling a number of different cell sizes or of providing variable charging currents, to obviate the obvious but cumbersome and costly expedient of providing a separate charger for each cell of each type that needs to be recharged.

However, none of the prior art techniques for providing variable or multiple cell charging with one piece of general purpose charging equipment has been completely successful. This lack of success appears to be primarily due to the inability of prior art devices to resolve several basic problems. The recharger designer generally does not know how many cells the user may wish to recharge at any one time nor does he know what physical sizes of cells the user may wish to recharge. Since the cells vary widely in electrical capacity, even within a given physical configuration, it cannot be predicted what charging current will be needed at a given cell holder in the charger. These variables combine to produce a formidable problem which is not solved by conventional approaches, singly or in combination. Charging apparatus that accepts only a fixed number of cells of one physical and electrical size, e.g., two 1 ampere-hour 'D' cells, are known but obviously achieve no flexibility whatever, in that the charger is inoperative for charging fewer as well as more cells than that fixed number. Cell holders that are adjustable to accept different physical cell sizes are also known but the physical adjustability feature tends to seriously reduce the convenience, simplicity and reliability of the holder. If the current supplied to the holder is fixed at one value, it must be set at the lowest common denominator of the values acceptable to the various cells for which the holder is designed. In such an arrangement an inordinate amount of time is required to charge a high-capacity cell at the rate tolerated by the lowest capacity cell. The alternative of providing a means for varying the current to be applied to one or more cell holders considerably increases both the cost and complexity of the charger. While the current may be adjusted automatically by a switching means in the cell holder which senses the physical size of the cell, this does not provide for a charge rate adjustment tailored to the numerous popular cells of different electrical capacity which share identical physical configurations. A basic drawback of all known prior art charging apparatus is that only a severely limited number of cells can be accommodated in the apparatus as supplied and the user cannot conveniently alter this number to suit his own requirements of the moment.

Accordingly, conventional devices suffer from at least several of the disadvantages of inflexibility, inconvenience, complexity, high cost, and lack of simplicity of operation, disadvantages which rule out such devices for many users of rechargeable batteries.

The present invention overcomes the drawbacks of prior art devices by providing a simple and inexpensive system which provides, in a single apparatus assembly, a means for charging a variable number of cells of differing physical size and electrical charging characteristics.

Essentially, the invention comprises a power supply module, e.g., a transformer module, and a plurality of charging modules wherein the charging modules are sequentially mated to each other mechanically and electrically and wherein a first charging module makes electrical and mechanical contact with said power supply module, to form a circuit in which each charging module forms one leg of a multi-leg parallel circuit. The individual charging modules mate with each other in "piggy-back" fashion and the terminal module is plugged into the power supply module to provide a complete parallel charging circuit. Each individual charging module is designed to physically accommodate a certain type of cell and is provided with a resistor in series with the cell holder contacts to provide the desired charging current for that particular cell. Adjacent charging modules may thus be used to charge simultaneously and efficiently entirely different cell types and sizes. Additional cells can be accommodated simply by plugging additional modules into a terminal module. In effect, the user can custom-build his own system, alterable at will, to suit the particular application involved in terms of number, size, and electrical capacities of the cells requiring charging. Since each module is an optimum design for the cell it is designed to charge, there is no design compromise and no adjustment is required, either preliminary or continuing, with respect to cell holder configuration or charging rate. For specific applications, the user need only assemble the charging modules he actually needs and thus avoids costly excess capacity.

A particular embodiment of the invention may be better understood with reference to the drawings in which:

FIG. 1 is a circuit diagram of a typical charging circuit in accordance with the invention; and FIG. 2 shows a charger assembly, embodying the circuit of FIG. 1, which assembly provides the detachability feature of the individual modules of the invention.

With specific reference to FIG. 1, line voltage is applied through line plug 1, line cord 3, fuse 5 and one section of switch 7 to the primary of transformer 9. The primary of transformer 9 is tapped so that two different voltages may be obtained at the secondary. The higher voltage constitutes the full output of the transformer and is used to charge the cells at the highest practical rate. The lower voltage allows previously-charged cells to be held at full charge level indefinitely without danger of either overcharge or self-discharge, i.e., it provides a trickle charge. One section of switch 7 selects the appropriate tap and therefore the appropriate mode of operation. The other section of switch 7 applies power to one of two neon pilot lamp assemblies 11 and 13 which provide visual indication of the charger's mode of operation. Switch 7 is controlled either manually or with a timer to provide a trickle charge after a set period of fast charging. Transformer 9 provides line isolation and reduces the line voltage to a level that is both safe and appropriate for battery charging. An autotransformer might be employed if line isolation is not required. Rectification may be effected at this point and/or in the charging modules described infra. The output from the transformer is applied to contacts 15 and 17 with which the first external charging module is mated. The portion of the circuit diagram to the left of dashed lines Y—Y thus comprises the "power supply module."

Each charging module A to E of FIG. 1 contains a series circuit of optimum design for charging the specific cells or cells contained within that particular module. This circuit consists of, in the case of the type 'A' module, resistor 19, a solid-state diode 21, and a cell holder 23. The value of the resistor is chosen to provide the appropriate current for charging the cell or cells for which the module is intended. A relatively high output voltage of transformer 9 allows the value of resistor 19 to be high enough to hold the current reasonably constant in the face of varying circuit parameters of line voltage, cell on-charge voltage, and number of cells being charged in other charging modules. Since the charging current for nickel-cadmium cells should be held as constant as practical, resistor 19 may be designed with a pronounced positive temperature coefficient, e.g., it may be an incandescent-type pilot lamp which has such a characteristic and serves the additional purpose of providing verification of positive electrical contact between the terminals of the cell and those of the cell holder. To obtain the desired resistance, a pilot lamp might also be used in combination with one or more separate conventional resistors. Diode 21 prevents one cell from discharging into another in the event that the power should fail or the charger should be turned off with some cells still in it. If rectification has not been provided in the transformer module the diode will additionally serve the essential function of providing the required direct current for charging. Cell holder 23 provides a means of making electrical contact with the cells. It may be polarized at both contacts so that no current will flow in the event one or more cells should be placed in the charger backwards. Male contacts 25 and 27 on the module receive power from the power supply module through any preceding charging modules. Power is carried through the module to the female contacts 29 and 31 where it is available for any following modules. Electrical interconnection between modules can be accomplished by numerous alternate means, including but not limited to metal links or wire clamped under screws, or a plugging arrangement to mate with a common socket or individual sockets on an external bus bar.

FIG. 2 is an exploded view of a typical combination of modules and illustrates a particular physical design embodying the circuit diagram shown in FIG. 1. Power supply module 51 is shown powering consecutive charging modules 53, 55, 57, 59, and 61. Fuse holder 41, containing fuse 5, is shown mounted in the power supply module. All other items in FIG. 2 correspond to those shown in FIG. 1.

It will be appreciated by the skilled artisan that the above described specific embodiment of my invention is but one of many alternatives encompassed by the scope of the present invention.

Thus, for instance, the electrical output of the power supply module may be alternating current or direct current. If it is alternating current a diode or other rectification means is employed in each charging module in order to obtain the required direct charging current. On the other hand, either half-wave or full-wave rectification can be effected in the secondary circuit of transformer 9 to provide the required direct current to each charging module. Full-wave rectification is generally preferred for reasons of increased efficiency and voltage regulation. Either form of rectification in the transformer module could, in yet another embodiment of the invention, be used in addition to, rather than as a substitute for, the rectifiers contained in the charging modules. It will be generally preferred to include half-wave rectification in the charging modules in addition to full-wave rectification in the transformer module in order to guard against one cell discharging into another in the event of any power interruption.

The power supply module, usually a transformer module, may, of course, comprise any conventional and convenient source of power, either internal or external. Suitable power sources are generators, fuel cells, solar cells, vehicular electrical systems, and large primary or secondary cells. The power source may be integral with, and form a part of, the power supply module as the latter term is used herein but the power source may also be external to the power supply module, in which case this module is a power converter, e.g., a transformer. It is further within a broad aspect of this invention to provide different power supply modules of varying capacity. Thus, heavy-duty regulated power supply units can be employed in large capacity industrial applications.

Constant voltage regulation in the power supply module, which should be maximized for optimum performance, can be provided by means of a self-regulating transformer or optionally a solid state regulator circuit. The trickle charge feature described in the specific embodiment shown in FIG. 1 can alternatively be obtained by a tap and switch in the transformer secondary circuit rather than by the switching arrangement in the primary circuit shown in FIG. 1. In addition, other pilot lamp configurations are, of course, possible; for instance, one pilot lamp can be turned on when the power supply module provides a trickle charge and both lamps can be on together when the power supply is delivering fast charge current.

The mechanical arrangement of the power supply module and the charging modules is not narrowly critical within the scope of this invention. Thus, the units can be physically stacked together either horizontally or vertically. Mechanical interconnection between the modules, or between the modules and a common external support such as a mounting board or strip, can be by means of conventional spring action or snap action catches or latches, either internal or external. Screws, straps or non-permanent adhesive might also be employed along with any other reversible method providing reasonably positive mechanical connection and desirably requiring a minimum of time and obviating the need for any equipment for assembly. A preferred aspect of this invention contemplates modules which are easily detached and recombined with each other to provide, in effect, a "kit" with which the user can tailor-build a charger assembly for the particular need indicated and for the particular combination of battery cells in terms of number, size and electrical requirements that need to be routinely charged.

For most purposes two series-connected cells per charging module is a convenient design but one cell per module is, of course, a possible embodiment. More than two cells in series can be accommodated with an appropriate increase in power supply module output voltage. In a two-cell-per-charging-module system a module accepting only one cell can be included to accommodate any odd cell or alternatively a "dummy" cell containing a resistor can be used to convert a two cell module into a one cell module. Special charging modules containing thermal cut-outs can be provided so that such charging modules can accept and charge fast charge cells.

It will be appreciated that this invention is applicable to the charging or recharging of any type of rechargeable battery, including alkaline batteries or wet cells, although it will be found to be most readily adapted for relatively small off-the-shelf (6 ampere-hour or smaller) nickel-cadmium cells, such as size AA cells, size C cells, size D cells, wherein these particular cells can be of varying electrical capacity. In addition, the invention may be used in reconditioning primary cells.

It is to be understood that the foregoing description of the invention is illustrative and that other embodiments within the spirit and scope of this invention will suggest themselves to those skilled in the art. This specification is, therefore, not to be construed as unduly limitative of the invention claimed.

What is claimed is:

1. Modular battery charger assembly comprising a power supply module having electrical contacts capable of providing a voltage substantially lower than line voltage; and a plurality of charging modules wherein each charging module is a self-contained unit comprising a supporting member having a cavity adapted to receive a fixed number of cells of specific physical size and of specific electrical characteristics, said cavity having two electrical charging contacts engageable by a cell placed thereinto, a resistor electrically connected in series with one of said electrical charging contacts in said cavity, said supporting member having (a) a first set of two electrical contacts which connect respectively to said resistor and to the terminus of the electrical charging contact of the cavity not linked to the resistor; said first set of electrical contacts of the support member being adapted to operatively engage the electrical contacts of said power supply module; and (b) a second set of two electrical contacts connected to said first set of electrical contacts and connectible with the first set of electrical contacts of the supporting member of an adjacent charging module; and said supporting member being provided with mechanical interconnecting means capable of engaging both said power supply module and an adjacent charging module, said mechanical interconnecting means providing easy detachability of said modules from each other, wherein the charging modules are sequentially mated to each other mechanically and electrically, and wherein a first charging module makes electrical and mechanical contact with said power supply module, to form a circuit in which each charging module forms one leg of a multi-leg parallel circuit, wherein the charging modules are detachably and replaceably mated to each other and to the power supply module wherein each charging module has plug and jack means by which that module is electrically and mechanically slidably connectible with an adjacent module.

2. Modular battery charger assembly as claimed in claim 1 having at least two charging modules detachably mated to each other mechanically and electrically.

3. Modular battery charger assembly as claimed in claim 2 wherein at least one charging module provides a charging current different from that provided by another charging module in said assembly.

4. Modular battery charger assembly as claimed in claim 3 wherein at least one charging module accommodates a cell having a different physical size from that accommodated by another charging module in said assembly.

5. Modular battery charger assembly as claimed in claim 3 wherein each charging module accommodates two cells.

6. Modular battery charger assembly as claimed in claim 3 wherein each charging module comprises a series circuit containing a resistor and a cell-holder wherein the resistor provides a charging current appropriate to a specific cell to be charged in the cell-holder.

7. Modular battery charger assembly as claimed in claim 6 wherein the resistor has a positive temperature coefficient.

8. Modular battery charger assembly as claimed in claim 7 wherein the resistor is an incandescent-type pilot lamp.

9. Modular battery charger assembly as claimed in claim 6 wherein said series circuit also contains a diode.

10. Modular battery charger assembly as claimed in claim 3 wherein said power supply module comprises a transformer capable of providing at least two different voltages at the secondary.

* * * * *